United States Patent [19]

Liebermann et al.

[11] Patent Number: 5,019,336
[45] Date of Patent: May 28, 1991

[54] MICRO-ADDITIONS TO TIN ALLOYS

[75] Inventors: Howard H. Liebermann, Succasunna; Tedd P. Hardman, Landing, both of N.J.

[73] Assignee: Allied-Signal Inc., Morris Township, Morris County, N.J.

[21] Appl. No.: 464,608

[22] Filed: Jan. 11, 1990

Related U.S. Application Data

[63] Continuation of Ser. No. 323,119, Mar. 13, 1989, abandoned, which is a continuation of Ser. No. 119,205, Nov. 5, 1987, abandoned, which is a continuation of Ser. No. 914,433, Oct. 2, 1986, abandoned.

[51] Int. Cl.$^5$ .............................................. C22C 13/00
[52] U.S. Cl. ..................................... 420/557; 420/562; 420/501; 420/589; 148/403

[58] Field of Search ............... 420/560, 561, 562, 557, 420/558, 559, 501, 576, 589; 148/403

[56] References Cited

U.S. PATENT DOCUMENTS 1,970,318  8/1934  Kern .................................. 420/501

Primary Examiner—R. Dean
Assistant Examiner—Robert R. Koehler
Attorney, Agent, or Firm—Gus T. Hampilos

[57] ABSTRACT

Tin-based alloys that include micro-additions of certain elements avoid the discoloration that otherwise afflict those alloys when they are melted. The discoloration, which results from tin oxidation, correlates with poor performance of the alloys in filler metal applications. A preferred method of preparing the alloys of the invention is by rapid solidification from the melt.

3 Claims, No Drawings

MICRO-ADDITIONS TO TIN ALLOYS

This application is a continuation of application Ser. No. 323,119, filed Mar. 13, 1989, which is a continuation of Ser. No. 119,205, filed Nov. 5, 1987, which is a continuation of Ser. No. 914,433, filed Oct. 2, 1986, all now abandoned.

BACKGROUND OF THE INVENTION

1. Field of the Invention

This invention relates to tin alloys and, more particularly, to tin alloys that contain small amounts of certain elements.

2. Description of the Prior Art

It has long been known that the oxidation resistance of tin can be improved by the addition of small amounts (about 0.1 at. %) of certain alloying elements that exhibit appreciable solid solubility in tin (W. E. Boggs et al., J. Electrochem. Soc. 110, 4 (1963)). More recently, the effect of certain impurity elements on the wetting properties of tin-lead solders was reported (M. L. Ackroyd et al., Metals Technology, February, 1975, p. 73).

A tin-based solder system for attaching semiconductor devices to a metal package was discussed in U.S. Pat. No. 4,170,472, issued Oct. 9, 1979, to Olsen et al.

During the past decade, several publications have appeared that describe progress in the development of rapidly solidified filler metal alloy foils (See, e.g., N.J DeCristofaro et al., Welding Journal 57(7), 33 (1978); D. Bose et al., Welding Journal 60(10), 29 (1981); and A. Datta et al., Welding Journal 63(10), 14 (1984)).

Nevertheless, tin-based alloys generally suffer discoloration on melting. This discoloration results from oxidation of the tin and, for filler metal alloys, is associated with poor performance (e.g., dewetting of substrates by molten solder and premature failure of devices).

SUMMARY OF THE INVENTION

In accordance with the present invention, a tin-based alloy contains at least one element selected from the group consisting of zinc, phosphorus, aluminum, magnesium, gallium, and calcium in an amount that totals between about 3 and 100 parts per million, by weight (ppm), and that is sufficient to inhibit substantially the oxidation of tin that would otherwise result on melting the alloy.

In operation, we provide a process for preparing a tin-based alloy that comprises adding small amounts of certain elements to the alloy during preparation. These additions yield an alloy that contains between 3 and 100 ppm of at least one element selected from the group consisting of zinc, phosphorus, aluminum, magnesium, gallium, and calcium, and that exhibits substantially no tin oxidation on melting.

DETAILED DESCRIPTION OF THE INVENTION

The present invention provides tin-based alloys and a process for making the alloys, where the distinctive feature of the alloys is that they contain micro-additions of certain elements and, as a result, do not exhibit the discoloration after reflowing that characterizes tin alloys of the prior art. The alloys of the present invention find particular advantage as filler metal alloys, whose performance is better—i.e., better substrate wetting by molten solder, greater device bond strength, etc.—than that of prior art tin-based alloys, which show discoloration due to tin oxidation. For convenience, we refer to the avoidance of discoloration as the distinctive feature of the alloys of this invention; it is, of course, the better performance, which correlates with that feature, that is the goal.

Among the filler metal alloys of this invention, preferred alloys consist essentially of Sn-(a)Ag-(b)Sb-(c)M, where M is one or more element selected from Zn, P, Al, Mg, Ga, Ca, and where a, b, and c are weight percents in the range from about 0 to 70, 0 to 45, and 0.0003 to 0.01, respectively, with Sn as the balance. More preferably, the alloy consists essentially of Sn-25Ag-10Sb-(c)M.

A preferred method for preparing the alloys of this invention is by rapid solidification from a melt, because that method permits the production of high-purity alloy at high production rates (A. Datta et al., Welding Journal, loc. cit.). Generally, this method involves expelling molten metal from a container, such as a crucible, into a quench liquid; onto a rapidly moving quench surface, such as a belt or wheel; or into the nip between two closely-spaced counter-rotating wheels. The melt is rapidly quenched to form wire, ribbon, strip, etc. These methods are summarized in U.S. Pat. No. 4,221,257, issued Sept. 9, 1980 to M. C. Narasimhan. In preparing metal alloys by rapid solidification, the molten metal is generally maintained in an inert atmosphere or vacuum. Otherwise, depending on the composition of the melt, the melt constituents may react with the ambient atmosphere. To avoid these reactions, the molten metal container material is also selected to be non-reactive with the melt constituents. To the extent that reactions with the container and/or the surrounding atmosphere are unavoidable, the melt composition must be adjusted. Therefore, the melt and the resultant alloy may comprise different compositions.

Micro-additions of a variety of elements have been found to substantially eliminate discoloration on melting of tin-based alloys. When the alloy is Sn-25Ag-10Sb, the minimum concentration of microalloying additions are as follows:

| MICROALLOYING ELEMENT | MINIMUM REQUIRED CONCENTRATION, PPM |
|---|---|
| Zn | 4 |
| P | 4 |
| Al | 5 |
| Mg | 11 |
| Ga | 12 |
| Ca | 28 |

The effect of these additions is generally additive; thus, if more than one element is added, sub-minimum amounts of the individual elements may suffice. If we denote the amounts (in ppm) of Zn, P, Al, Mg, Ga, and Ca as p, q, r, s, t, and u, respectively, then the minimum addition to avoid discoloration is given by $$p/4 + q/4 + r/5 + s/11 + t/12 + u/28 \sim 1$$

Additions may be made directly to the melt or, alternatively, in the form of tin pellets that are enriched in the additive.

The following examples are presented in order to provide a more complete understanding of the invention. The specific techniques, conditions, materials, and reported data set forth to illustrate the principles and practices of the invention are exemplary and should not be construed as limiting the scope of the invention.

EXAMPLE 1 (Prior Art)

An alloy of composition Sn-25Ag-10Sb was cast from the melt onto a solid copper casting wheel to form ribbon. The casting wheel had a diameter of 13 cm and a width of 25 mm. It was rotated at a speed of 2,000 rpm, corresponding to a circumferential surface velocity of 13.3 m/s. A nozzle having a 0.5 mm diameter orifice was mounted perpendicular to the direction of movement of the peripheral surface of the casting wheel, such that the gap between the orifice and the surface of the casting wheel was about 2 mm. Molten metal at 750° C. was supplied through the orifice under an applied gas pressure of about 15 psig (~100 kPa). The metal solidified on the surface of the chill roll into a ribbon, 0.04 mm thick and 2.8 mm wide. The alloy, which had a melting temperature of about 235° C., showed noticeable surface discoloration on reflowing in a die bonding oven.

EXAMPLE 2

The procedure of Example 1 was repeated, employing the same equipment and process conditions, except that 50 ppm of magnesium were admixed into the base alloy. No detectable discoloration of this alloy occurred on reflowing the ribbon in a die bonding oven.

EXAMPLE 3

The procedure of Example 1 was repeated, employing the same equipment and process conditions, except that 10 ppm of magnesium were admixed into the base alloy. Substantial discoloration of this alloy occurred on reflowing the ribbon in a die bonding oven.

EXAMPLE 4

The procedure of Example 1 was repeated, employing the same equipment and process conditions, except that 3, 3, and 9 ppm of zinc, aluminum, and magnesium, respectively, were admixed into the base alloy. No detectable discoloration of this alloy occurred on reflowing the ribbon in a die bonding oven.

EXAMPLE 5

The procedure of Example 1 was repeated, employing the same equipment and process conditions, except that 2, 1, and 2 ppm of zinc, aluminum, and magnesium, respectively, were admixed into the base alloy. Substantial discoloration of this alloy occurred when reflowing the ribbon in a die bonding oven.

EXAMPLE 6

A forced-convection-cooled casting wheel having a beryllium copper substrate was used to prepare the alloy of Example 1. The casting wheel had a diameter of 38 cm and a width of 5 cm. It was rotated at a speed of 740 rpm, corresponding to a circumferential surface velocity of 14.7 m/s. The substrate was conditioned continuously during the run by an idling brush wheel inclined about 10° out of the casting direction. A nozzle having a slotted orifice of 0.38 millimeter width and 25 mm length defined by a first lip and a second lip each having a width of 1.5 millimeters (lips numbered in direction of rotation of the chill roll) was mounted perpendicular to the direction of movement of the peripheral surface of the casting wheel, such that the gap between the first lip and the surface of the casting wheel was 0.15 mm. Sn-25Ag-10Sb alloy was admixed with 20, 10, and 5 ppm of zinc, aluminum and magnesium, respectively, and supplied through the orifice at 750° C. under an applied gas pressure of about 5 psig (~34 kPa). It solidified on the surface of the chill roll into a strip of 65 $\mu$m thickness and 25 mm width. On reflowing a length of this ribbon in a die bonding oven, no detectable discoloration of the alloy surface occurred.

EXAMPLE 7

The procedure of Example 6 was repeated, except that a pellet enriched with the micro-additions was used in place of directly adding the micro-additions. Specifically, tin alloy containing 5.4, 2.7, 2.7, and 2.7 wt. % of zinc, aluminum, magnesium, and gallium was first prepared by heating the constituent ingredients under argon atmosphere to 750° C. in order to form an additive-enriched metal alloy pellet. Thirteen kg of tin-based metal alloy having composition Sn-25Ag-10Sb, with a melting temperature of about 235° C., was melted together with the enriched additive metal alloy pellet and cast by the same method as in Example 6. On reflowing a length of this ribbon in a die bonding oven, no detectable discoloration of the alloy surface occurred.

We claim:

1. A tin-based alloy consisting essentially of silver, antimony, tin, and at least one element selected from the group consisting of zinc, phosphorus, aluminum, magnesium, gallium and calcium, the total concentration in the alloy of elements of said group being between about 3 and about 100 parts per million, by weight, and sufficient to inhibit substantially oxidation of tin during melting of the alloy.

2. The alloy of claim 1 in which silver is about 25 weight percent and antimony is about 10 weight percent.

3. The alloy of claim 1 in which the amounts, in ppm, of Zn, P, Al, Mg, Ga, and Ca, are denoted by p, q, r, s, t, and u, respectively, and $p/4 + r/5 + s/11 + t/12 + u/28$ equals at least about 1.

* * * * *

UNITED STATES PATENT AND TRADEMARK OFFICE
CERTIFICATE OF CORRECTION

PATENT NO. : 5,019,336
DATED : May 28, 1991
INVENTOR(S) : Howard H. Liebermann

It is certified that error appears in the above-identified patent and that said Letters Patent is hereby corrected as shown below:

Col. 4, line 53, after "+", it should be --q/4+--.

Signed and Sealed this

Twenty-second Day of September, 1992

Attest:

DOUGLAS B. COMER

Attesting Officer  Acting Commissioner of Patents and Trademarks